Oct. 22, 1968  J. BOILEAU  3,406,733
TIRE COVERS
Filed July 21, 1966
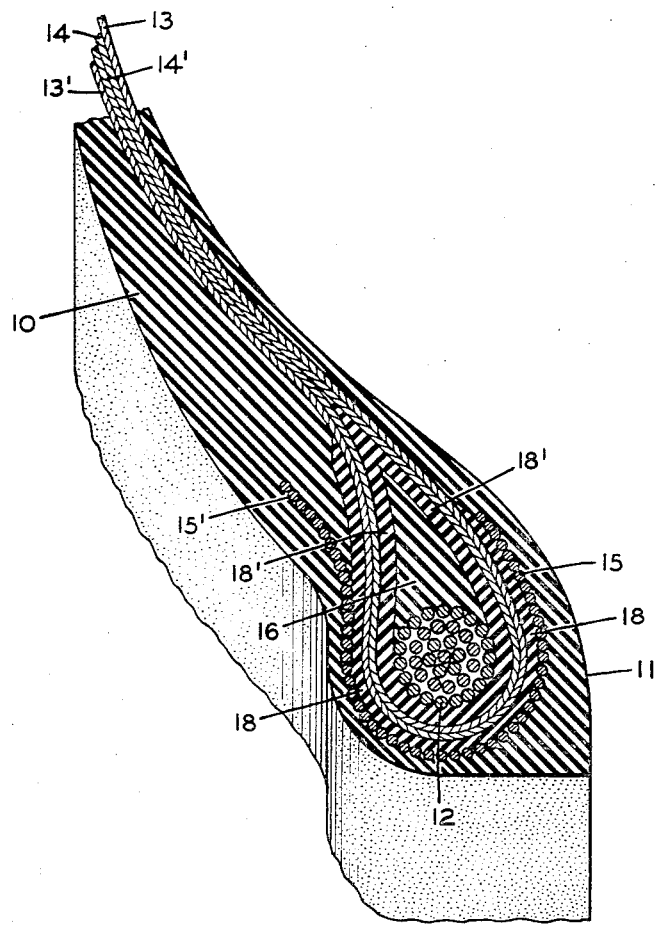
INVENTOR
JACQUES BOILEAU
BY
Prewbaugh. Free. Graves Donohue
HIS ATTORNEYS United States Patent Office 3,406,733
Patented Oct. 22, 1968

3,406,733
TIRE COVERS
Jacques Boileau, Clermont-Ferrand, France, assignor to Compagnie Generale des Etablissements Michelin, raison sociale Michelin & Cie, Clermont-Ferrand, Puy-de-Dome, France
Filed July 21, 1966, Ser. No. 567,000
Claims priority, application France, July 24, 1965, 25,940
3 Claims. (Cl. 152—362)

ABSTRACT OF THE DISCLOSURE

A bead for a pneumatic tire having a carcass of substantially radially-directed nonmetallic cords is provided with a bead wire around which the cords are folded and first and second layers of an elastomeric buffering composition. The elastomeric buffering composition is on opposite sides of the cords extending around the bead wire and envelops the cords in the vicinity of the bead wire. The composition has a modulus of elasticity in g./mm.² measured at 100% elongation not exceeding 0.8 of the modulus of elasticity in kg./mm.² of the carcass cords measured under a load equalling one-tenth of their breaking load.

---

The present invention relates to improvements in pneumatic tires, and more particularly to improvements in the beads of pneumatic tires having carcasses formed of radial cords or cables.

Tires or tire casings for passenger vehicles, highway and off-highway trucks and tractor trailers having a radial carcass made of metallic cords or cables combined with a peak or crown reinforcement in the tread formed of metal or textile cords or mixed textile and metal filaments are well-known and recognized as having excellent roadability and operating life. However, in the case of tires for heavy duty vehicles, it has been found that the radial carcass may break away from the rubber surrounding it in the region of the bead after a relatively small number of miles. This phenomenon appears more frequently in the larger sized tires having radial carcasses formed of cords different from the steelwires or cables commonly used in radial carcass tires.

The present invention relates to improvements in the beads of radial carcass tires having carcass cords made of material with a low modulus of elasticity, such as rayon, polyamides, polyesters, polyvinyl alcohols and the like, to prevent their separation, especially in the regions of the bead in contact with the rim.

More partciularly, ply separation and weakening of the tire in the bead zones are avoided by embedding the carcass cords in the beads in a layer of a relatively soft elastomer to insulate or buffer the carcass from the rigid portions forming the rest of the bead.

It has been discovered that the proper modulus of elasticity for the buffering layers can be determined as follows: If M is the modulus of elasticity in kg./mm.² of the cords forming the carcass, and $M_{A100}$ is the modulus of elasticity in g./mm.² of the buffer mixture at 100% elongation, $M_{A100}$ should not exceed 0.8 M.

The modulus of elasticity M of a cord corresponds to the equation $$\frac{F}{S} = M\frac{dL}{L}$$

in which S and L are, respectively, the cross-section and the initial length of a cord sample and $dL$ is its elongation on application of a force F equalling one-tenth of the breaking load of the cord.

The modulus of elasticity at 100% elongation of a mixture corresponds to the relationship $F/S$, with F being the force making it possible to double the length of a sample having the section S.

There is also an empirical relationship between the modulus $M_{A100}$ and the Shore hardness of a mixture. This relationship is:

Shore hardness=$56 \log_{10}M_{A100}-67$

This relationship enables the modulus to be determined quickly by measuring the Shore hardness. The condition to be satisfied is, therefore, that the Shore hardness of the mixture be less than or equal to $56 \log_{10}(0.8 \text{ M})-67$, i.e., $56 \log_{10}M-72.5$ By way of example, polyamide (nylon) cords commonly used in radial carcasses have a modulus of 280 kg./mm.². With such cords, an elastomeric buffer composition having a modulus at 100% elongation of less than 225, i.e., a Shore hardness not exceeding 65, is used. The best results are obtained with a buffer composition having a Shore hardness 60 and 2 mm. thickness on both sides of the carcass. Thus, if the resistance to wear and tear with the carcass cords embedded in an elastomeric buffer composition having Shore hardness 72 is approximately 5,000 km., it will exceed 25,000 km. when a composition having Shore hardness 60 is used. This result is surprising for the reason that it would not be expected that heavy wear and tear would occur in the bead region in permanent or intermittent contact with the rim, due to the use of soft rubber compositions in the bead, for experience had taught that it was advisable to use exclusively hard rubber compositions in the beads of radial carcass tires in order to limit shifting of the beads on the rim and to diminish wear and tear.

For a better understanding of the invention, reference may be had to the accompanying drawing in which the single figure is a cross-sectional view of a tire bead embodying the invention.

The sidewall 10 of a tire has a bead 11 embodying the invention at its inner edge for mounting on the rim of the wheel. The bead 11 is reinforced by a metal bead wire or cable 12. The sidewall 10 is composed of a natural or synthetic elastomeric composition of conventional type and modulus of elasticity and is reinforced by four plies 13, 13', 14, 14' of nylon cord with a modulus of elasticity of 280 kg./mm.². These cords are arranged in planes passing through the axis of the tire, i.e., radially. Plies 13 and 14 are folded back in a loop around the wire 12 thus forming plies 13' and 14' in the sidewall. The bead 11 may include, in the known manner, a narrow ply of metal cords 15, 15' for stiffening the bead, and a filling 16 of an elastomer mixture of substantially triangular cross-section, located outwardly of the bead wire 12 in the loop formed between the cord plies 13, 14 and 13' and 14'.

In accordance with the invention, layers 18 and 18' of an elastomer having a modulus of elasticity of approximately 180 and a Shore A hardness of about 60 are positioned on either side of plies 13 and 14 and 13' and 14', in the region of the bead 11. The layer 18 is interposed between the plies 13, 13' and the metal cord ply 15, 15' and is bonded to these plies. The layer 18' is interposed between the plies 14, 14' and the bead wire 12 and the filling 16, and is bonded to them. Each of the plies 18 and 18' has a thickness of approximately 2 mm. Their composition is, in this example, as follows:

| | Weight by parts |
|---|---|
| Natural rubber | 100 |
| Stearic acid | 2 |
| "Agerite" powder | 1 |
| Zinc oxide | 5 |
| Philback O black | 40 |
| Sulfur | 3 |
| Vulcanization accelerator (Captax) | 0.8 |

Other elastomeric compositions containing synthetic rubbers, synthetic plastics or resins compatible with the other compositions in the bead also can be used.

The layer 18 which is located between the plies 13 and 15, 15′ ends at about the height of each of the edges of the ply 15, 15′.

The other elastomeric compositions in the bead have, apart from the layers 18, 18′, a modulus of elasticity in excess of 0.8 M or a Shore A hardness higher than 65, although the filling 16 need not satisfy this condition.

With beads of the type described above, the provision of the layers of low modulus buffering composition greatly enhances resistance to stresses in and adjacent to the bead area of the tire. Evidently the low modulus buffering layers serve to compensate for the differential extension and contraction of the carcass cords and the harder and more rigid compositions making up the remainder of the bead by distributing the stresses on the cords throughout a greater length thereof in and adjacent to the beads, thereby eliminating zones of concentrated stress which cause ply separation and breakage.

It will be understood that the arrangement of the bead wires or cables in the beads, the use of additional reinforcing plies in the beads, as well as other variations in the composition of the buffering layers and other compositions in the bead, are within the contemplation of the invention and, accordingly, the invention is limited only as defined in the following claims.

I claim:

1. A bead for a pneumatic tire having a carcass of substantially radially directed nonmetallic cords comprising a bead wire around which said cords are folded, and first and second layers of an elastomeric buffering composition on opposite sides of the cords extending around said bead wire and enveloping said cords in the vicinity of said bead wire, said composition having a modulus of elasticity in g./mm.$^2$ measured at 100% elongation not exceeding 0.8 of the modulus of elasticity in kg./mm.$^2$ of said carcass cords measured under a load equalling one-tenth of their breaking load.

2. The bead set forth in claim 1 comprising a third layer of a composition having a modulus higher than the modulus of said buffering composition around the latter and a ply of metallic cords extending around said bead cable outwardly of said carcass cords and embedded in said third layer.

3. The bead set forth in claim 1 in which said carcass cords are composed of a polymer selected from the group consisting of rayons, polyamides, polyesters and polyvinyl resins.

References Cited

UNITED STATES PATENTS

| 2,971,553 | 2/1961 | Woodall | 152—362 |
| 3,253,639 | 5/1966 | Travers | 152—362 |

FOREIGN PATENTS

| 1,369,464 | 7/1964 | France. | |

ARTHUR L. LA POINT, *Primary Examiner.*

C. B. LYON, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,733                                          October 22, 1968

Jacques Boileau

It is certified that error appears in the above identified patent and that said Letters Patent are hereby corrected as shown below:

Column 2, line 25, cancel "not".

Signed and sealed this 10th day of March 1970.

(SEAL)
Attest:

Edward M. Fletcher, Jr.                          WILLIAM E. SCHUYLER, JR.
Attesting Officer                                       Commissioner of Patents